United States Patent [19]

Kim

[11] Patent Number: 5,862,468
[45] Date of Patent: Jan. 19, 1999

[54] DEVICE FOR MOVING AND DETACHING A PANEL

[75] Inventor: Seung-Seob Kim, Kyunggi-Do, Rep. of Korea

[73] Assignee: Daewoo Electronics Co., Ltd., Seoul, Rep. of Korea

[21] Appl. No.: 810,973

[22] Filed: Feb. 27, 1997

[30] Foreign Application Priority Data

Jun. 21, 1996 [KR] Rep. of Korea ..................... 96-22738

[51] Int. Cl.$^6$ .................................................. H04B 1/08
[52] U.S. Cl. ........................ 455/346; 455/348; 455/349; 312/7.1; 369/75.1
[58] Field of Search .................................... 455/345, 346, 455/347, 348, 349, 351; 361/814; 312/7.1, 45, 222; 369/6, 7, 75.1, 77.2; 360/71, 137

[56] References Cited

U.S. PATENT DOCUMENTS

| | | | |
|---|---|---|---|
| 5,177,730 | 1/1993 | Utsugi | 455/346 |
| 5,222,007 | 6/1993 | Suzuki et al. | 455/348 |
| 5,575,544 | 11/1996 | Hasegawa et al. | 455/349 |
| 5,637,928 | 6/1997 | Nakajima et al. | 455/346 |

FOREIGN PATENT DOCUMENTS 0 401 475  12/1990  European Pat. Off. .

*Primary Examiner*—Thanh Cong Le
*Attorney, Agent, or Firm*—Jacobson, Price, Holman & Stern, PLLC

[57] ABSTRACT

A device for moving and detaching a panel opens and closes a recording medium inserting slot installed at an escutcheon by upwardly and downwardly moving a sliding plate connected with a rear face of the panel by using a push-pull portion installed at the car audio body. The push-pull portion pushes and pulls one side of the sliding plate in one of the directions toward the panel and the car audio body. In both side walls of an escutcheon there are formed guiding grooves having a gentle slope in a longitudinal direction. The sliding plate has engagement protrusions for connecting the guiding grooves and a connecting portion to rotatably connect one side of said sliding plate and push-pull portion. The push-pull portion has connecting pieces connected with a connecting portion of the sliding plate and a limited movement portion to slide the sliding plate in a predetermined range. The push-pull portion pushes and pulls the sliding plate by being supplied with moving force generated from a moving force generating portion through a moving force transferring portion. A detaching portion fixed at the rear face of the sliding plate hooks the rear face of the panel so that the panel is fixed at the sliding plate.

9 Claims, 4 Drawing Sheets

DEVICE FOR MOVING AND DETACHING A PANEL

BACKGROUND OF THE INVENTION

1. Field of the Invention

The present invention relates to a device for moving and detaching a panel, and more particularly, to a device for moving and detaching a panel of car audio equipment in which the panel can be detached from the car audio body and opens and closes a recording medium inserting slot by a sliding plate which has a rear side installed in the panel and is upwardly and downwardly movable.

2. Description of the Prior Art

Recently developed types of audio equipment are generally compact. The panel installed in the front side of an audio apparatus comprises a liquid crystal display to display information about operations of the audio equipment, function knobs to indicate the operations, a recording medium inserting slot, and the like. In a car installed with the car audio having the panel, if the audio equipment is stolen when the car is unoccupied, it is proposed that the equipment cannot be used without the panel, thereby discouraging possible theft by detaching the panel from an escutcheon.

In the appended figures, FIG. 1 is a side view of a panel detaching apparatus, and FIG. 2 is a plan view of the panel when the panel detaching apparatus is installed on the car audio equipment.

Reference symbol A represents an audio equipment body and B a panel. At the front of audio equipment body A is formed a hollow portion 2 that accommodates panel B. On one side of hollow portion 2 is formed an inwardly projecting strip 3 that is adapted to fit into an engagement recess 1 of panel B. At the rear of hollow portion 2 in the audio equipment body A, a shaft 11 is provided on which a first arm 12 is rotatable. First arm 12 is urged toward hollow portion 2 by a torsion spring 13 wound on shaft 11. First arm 12 has a holder 14 mounted thereon through a shaft 15. Holder 14 also has a shaft 16 on which is supported an engagement claw 17 that has a claw portion 17a to fit into engaging recess 4 of panel B and is rotatable. Wound on shaft 16 is a torsion spring 18 whose ends are engaged with holder 14 and engagement claw 17 to urge claw portion 17a of engagement claw 17 to fit in engaging recess 4. On the back of hollow portion 2, a shaft 19 is secured to a support piece 19a at a position farther away from hollow portion 2 than shaft 11 and close to the end of first arm 12. Shaft 19 and a shaft 20 of holder 14 are connected together by a second arm 21. First arm 12 has a stopper pin 22 erected thereon, and a support plate having a vertically disposed shaft is mounted at the back of hollow portion 2. On shaft of support plate is supported a rotating plate 25 that has an engagement notch 25a to engage with stopper pin 22. A torsion spring 26 wound on shaft and engaged with support plate urges rotating plate 25 in a direction that causes engagement notch 25a to engage with stopper 22. Rotating plate 25 is connected with a link plate 28 that is mounted on a push knob 27, which projects from the front surface of the audio equipment body A. When push knob 27 is depressed, rotating plate 25 is rotated against the force of torsion spring 26 so as to disengage its engagement notch 25a from stopper pin 22. When pressing of the push knob 27 is stopped and then released, rotating plate 25 is rotated by torsion spring 26 until its engagement portion 25b comes into contact with a stopper arm 24a of support plate. Rotating plate 25, while rotating, pushes back push knob 27 and then stops.

Next, the procedure for removing panel B from audio equipment body A will be explained.

First, when push knob 27 is pressed, rotating plate 25 is rotated so as to release stopper pin 22 from engagement notch 25a, and then first arm 12 is rotated by torsion spring 13 in a direction that pushes panel B out of equipment body A. Then, holder 14 which is connected to first arm 12 through shaft 15 departs from audio equipment body A together with engagement claw 17 that is mounted on holder 14 through shaft 16. Since shaft 20 of holder 14 is connected with second arm 21, shaft 20 of holder 14 moves along a locus of second arm 21. Panel B is urged downwardly as indicated in FIG. 2 by the rotation of first arm 12, so that panel B rotates about an engagement point between engagement recess 1 and protruded strip 3. At this time, since claw portion 17a of engagement claw 17 is disengaged in the engaging recess 4 of panel B, it moves along a locus of an arc about the engagement point of recess 1. Also at the same time, holder 14 and engagement claw 17 are returned to the original position by torsion spring 18. Panel B is pushed downwardly in FIG. 2 for disconnecting protruded strip 3 from engagement recess 1, and is released from audio equipment body A.

However, the conventional panel detaching apparatus requires a number of members for connecting the push knob and the engagement claw. Therefore, the number of procedures required when the user attaches the panel detaching apparatus to the car stereo body is numerous. Accordingly, it takes an inordinate time for the user to attach the panel detaching apparatus.

Also, the conventional panel detaching apparatus is arranged with the connection members from the push knob to the engagement claw in a longitudinal direction of the panel. Thus, a wide space for the panel detaching apparatus is required.

Also, the construction of the panel is complex due to the front face having the recording medium inserting slot.

SUMMARY OF THE INVENTION

Accordingly it is an object of the present invention to provide a device for moving and detaching a panel to detach the panel from the car audio body by using simple members.

It is another object of the present invention to provide a device for moving and detaching a panel which is a compact device for detaching the panel.

It is another object of the present invention to provide a device for moving and detaching a panel which has a front side having a simple construction by installing a recording medium inserting slot at an escutcheon.

To achieve the above objects, the present invention comprises:

- an escutcheon having a recording medium inserting slot formed in it to insert/eject the recording medium into/from the recording medium inserting slot and installed at a car audio body to close an opening portion of the car audio body;
- a sliding plate having a front side detachably connected with the panel and for opening and closing the recording medium inserting slot by being upwardly and downwardly slid when a side of the sliding plate is pushed toward one of the panel and the car audio body;
- a push-pull portion connected with the side of the sliding plate for pushing and pulling the side of sliding plate toward one of the panel and the car audio body; and
- a detaching portion installed on the rear face of the sliding plate and for detachably connecting the panel with the sliding plate due to an elastic force and a restoration force of the detaching portion.

The escutcheon comprises a front plate formed with a slit through which one side of the push-pull portion connected with the sliding plate is moved toward one of the panel and the audio body and both side walls folded from the edges of the front plate toward the panel and formed a guiding groove having a gentle slope along the longitudinal direction to guide the sliding plate. The push-pull portion pushes and pulls the sliding plate according to the operation of a motor having a pinion gear. The push-pull portion comprises a rack gear to transfer the driving force of the motor to the sliding plate and a limited movement portion to limit the sliding range of the sliding plate.

According to this construction, the device for moving and detaching the panel of the present invention is simply constructed and reduces the number of construction members because the panel is secured to the sliding plate by hooking the rear face of the panel with the detaching portion, and the panel is released from the sliding plate when the panel disconnects from the sliding plate due to to pushing the detachment knob installed at the panel.

The device for moving and detaching the panel in the present invention has no other connection members which are connected between the detachment knob for detaching the panel from the sliding plate. Also, the construction of the detachment portion is simple and the number of procedures required when the user attaches the detachment portion on the car audio body is decreased so that it takes minimal time for the user to attach the detachment portion on the car audio body.

The recording medium inserting slot is smoothly opened and closed due to the upward and downward movement of the sliding plate by the operation of the push-pull portion. Also, the panel is inclined toward the escutcheon at a predetermined angle so as to turn the front of the operation portion of the panel toward the upper direction when the recording medium inserting slot is opened, so that the operation knobs can be easily operated.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Figure 1:
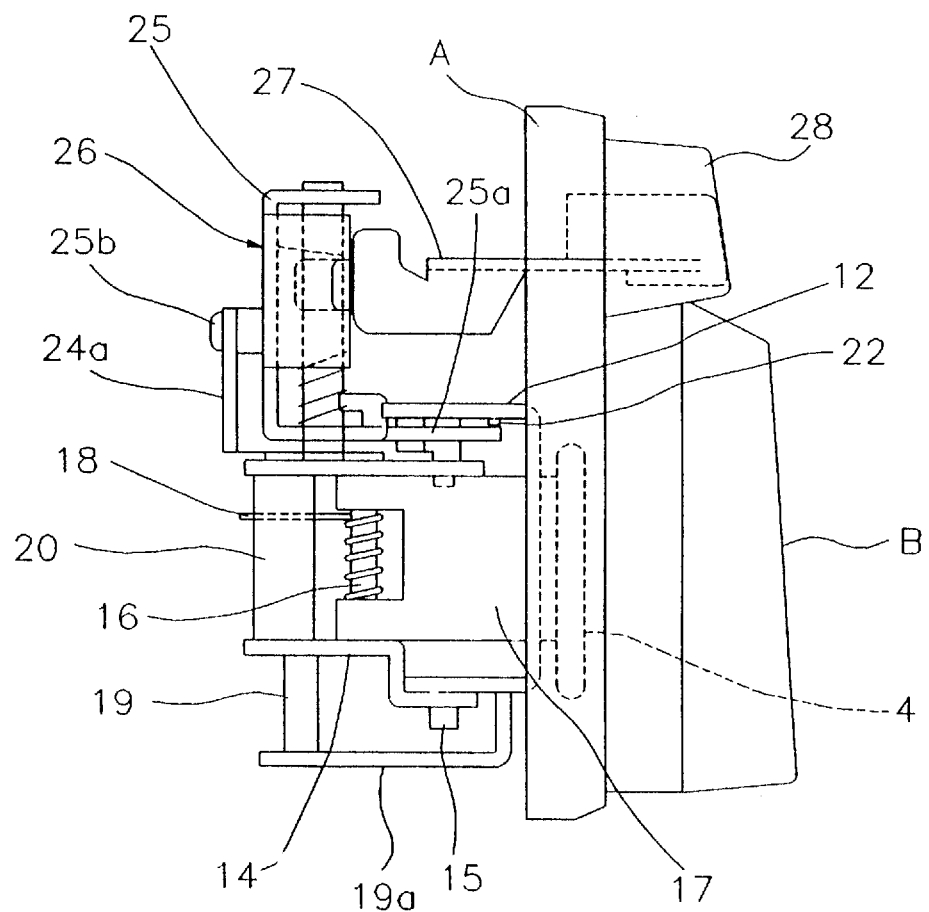
FIG. 1 is a side view of the conventional panel detaching device.
Figure 2:
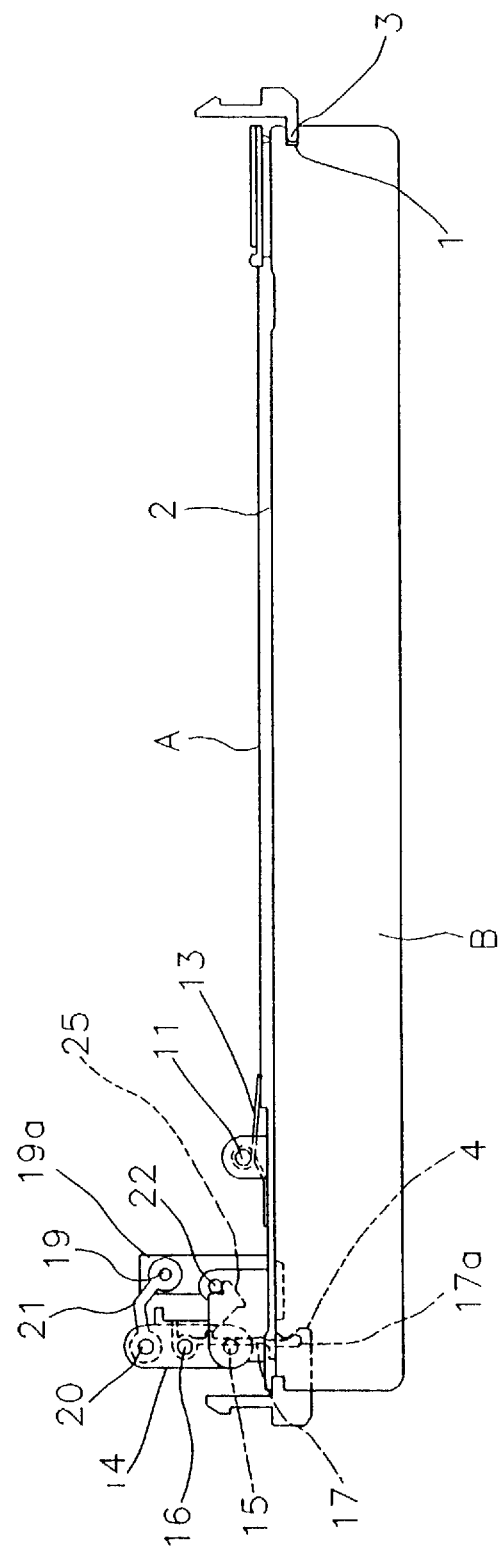
FIG. 2 is a plane view of the conventional panel detaching device in a mounted condition.
Figure 3:
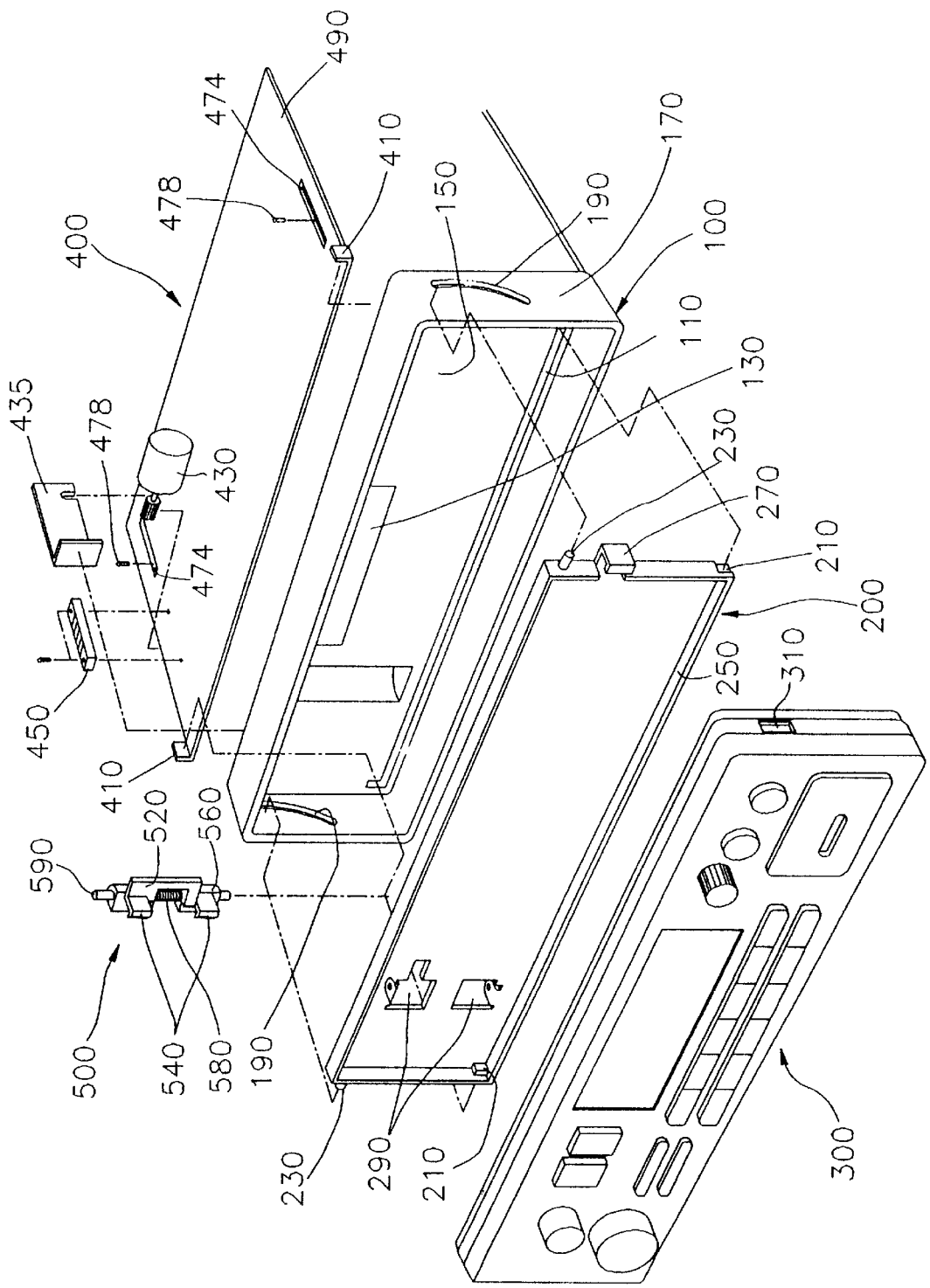
FIG. 3 is a perspective exploded view of the construction of the device for moving and detaching the panel according to the present invention.
Figure 4A:
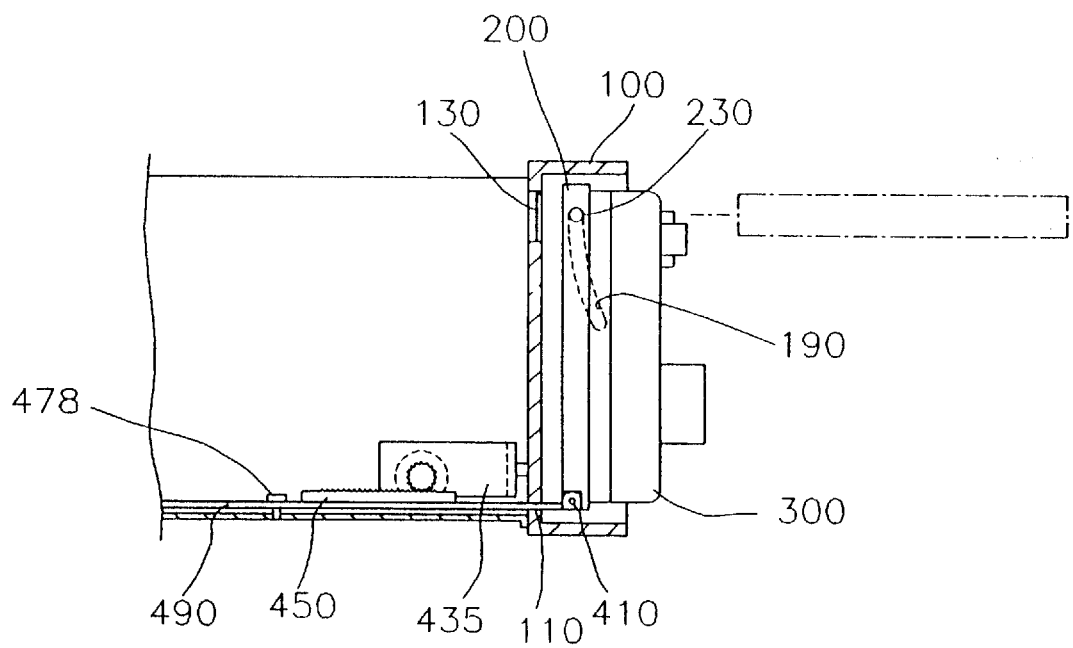
FIG. 4A is a longitudinal sectional view of a device for moving and detaching a panel according to the present invention when the recording medium inserting slot is closed.
Figure 4B:
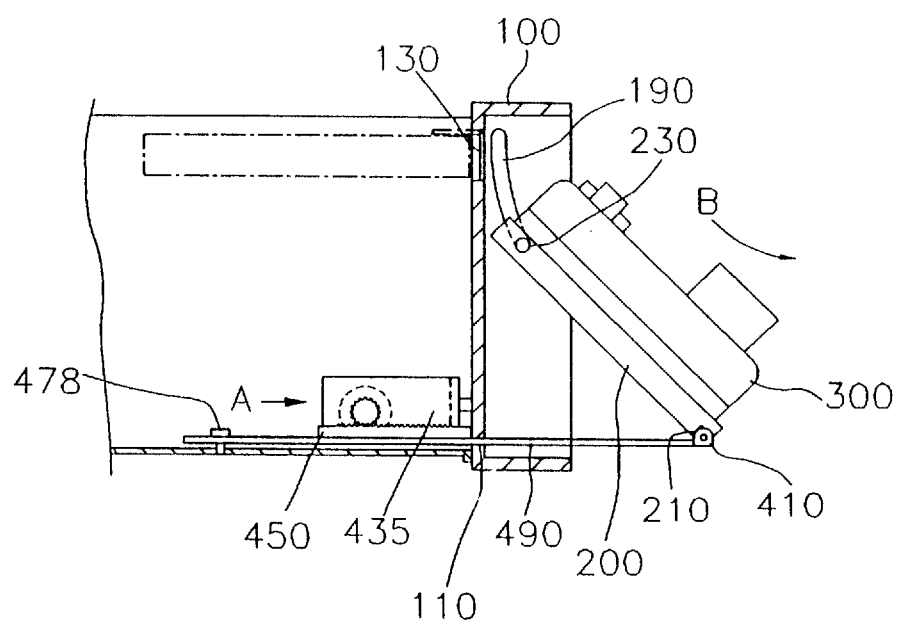
FIG. 4B is a longitudinal sectional view of a device for moving and detaching a panel according to the present invention when the recording medium inserting slot is opened.

Hereinafter, the construction of the device for moving and detaching the panel according to the present invention will be described in detail with reference to the FIGS. 3, 4A, and 4B.

A recording medium inserting slot 130 for inserting and ejecting the recording medium is formed in an escutcheon 100 installed at the front side of the car audio body for closing the opening of the car audio body. A sliding plate 200 to open and close recording medium inserting slot 130 is installed on the front side of escutcheon 100. Sliding plate 200 is detachably connected with the rear side of a panel 300 by a detaching portion 500. Sliding plate 200 is upwardly and downwardly slid according to pushing one side of sliding plate 200 in one of panel and car audio body directions. A push-pull portion 400 is connected with one side of sliding plate 200 to push and pull sliding plate 200 in one of panel 300 and the car audio body directions. Detaching portion 500 is installed on the rear side of sliding plate 200 for detachably connecting panel 300 and sliding plate 200.

Escutcheon 100 comprises a front plate 150 formed with a slit 110 for the coming in and out one of side of push-pull portion 400 connected with one side of sliding plate 200 to push and pull sliding plate 200 and a sunken portion 120 extended toward car audio body for accommodating detaching portion 500. Both side walls of escutcheon 100 are folded from both side edges of front plate 150 toward panel 300. Guiding grooves 190 having a gentle slope are longitudinally formed to lead sliding plate 200 on both side walls.

Sliding plate 200 comprises an accommodating portion 250 folded from the edges of sliding plate 200 toward panel 300 and extended for receiving panel 300. An accommodating portion 250 comprises a connecting portion 210 connected with push-pull portion 400 for transferring the movement of push-pull portion 400 to sliding plate 200, engagement protrusions 230 protruded from sides of accommodating portion 250 and engaged with guiding grooves 190 to slide sliding plate 200 according to the operation of push-pull portion 400, and a fastening portion 270 to hook sliding plate 200 on panel 300. In the front side of sliding plate 200 is formed passing holes 290 being passed through detaching portion 500 to fix panel 300 at sliding plate 200 by detaching portion 500. Fixing leaves 295 for fixing detaching portion 500 at sliding plate 200 are folded from skirts of passing holes 290 toward escutcheon 100 and extended.

Push-pull portion 400 comprises connecting pieces 410 which are folded from both sides of a push-pull member 490 to connect with connecting portion 210 of sliding plate 200 and a limited movement portion for moving sliding plate 200 in a predetermined range. The limited movement portion comprises slits 474 formed with predetermined lengths at push-pull member 490 and rivets 478 pierced through slits 474 and fixed at the bottom side of the car audio body. A moving force generating portion 430 for supplying the moving force to push-pull member 490 is fixed at a fixing bracket 435 installed at the rear side of escutcheon 100. A moving force transferring portion 450 connects moving force generating portion 430 with push-pull member 490 for transferring the moving force from moving force generating portion 430 to push-pull member 490. In the preferred embodiment, moving force generating portion 430 is a motor having a pinion gear and moving force transferring portion 450 is a rack gear fixed at push-pull member 490 and engaged with the pinion gear.

Panel 300 comprises a front face installed with a detachment knob 330 for releasing the connection between detaching portion 500 and panel 300 in order to detach panel 300 from sliding plate 200. Fixing grooves(not shown in figures) fastened with detaching portion 500 for fixing panel 300 at sliding plate 300 are formed at a predetermined position on the rear side of panel 300. A fastened groove 310 piercing through fastening portion 270 of sliding plate 200 and connecting therewith is formed at a side face in panel 300. Detaching portion 500 has a pushed part 520 urged by detachment knob 330 to release the connection between panel 300 and sliding plate 200. Fixing members 540 for fastening panel 300 to sliding plate 200 are integrally formed with the front side of pushed part 520 in upper and lower parts of pushed part 520. Supporting portions 560 are integrally formed with fixing members 540 to insert a detaching portion fixing shaft 590 through supporting portions 560 for fixing detaching portion 500 at sliding plate 200. A spring member 580 is installed between supporting portions 560 to insert detaching portion fixing shaft 590 through it. Also, the rear faces of pushed part 520 and sliding plate 200 are pushed by an elasticity of spring member 580 for returning fixing members 540 to the original position when panel 300 is detached from sliding plate 200.

The operation and effects of the device for moving and detaching the panel according to the present invention as constructed above will be described.

First, spring member 580 is inserted between supporting portions 560 of detaching portion 500 for urging pushed part 520 of detaching portion 500 and the rear side of sliding plate 200 by an elasticity of spring member 580, and detaching portion 500 is fixed at the rear side of sliding plate 200 by inserting detaching portion fixing shaft 590 through fixing leaves 295 of sliding plate 200 and supporting portions 560. Rack gear 450 is fixed at a predetermined position of push-pull member 490. Push-pull member 490 is installed at the car audio body by piercing rivets 478 through slits 474 and fixing rivets 478 at the car audio body. In the center of front plate 150 of escutcheon 100 is installed recording medium inserting slot 130. Fixing bracket 435 and motor 430 are fixed at the rear side of escutcheon 100 so that the pinion gear installed on motor 430 is engaged with rack gear 450. Engagement protrusions 230 of sliding plate 200 are pierced through guiding grooves 190 of escutcheon 100. Connecting pieces 410 of push-pull member 490 are lead to the outside of escutcheon 100 through slit 110 formed at a lower part of escutcheon 100. Hinge pin(not shown in figures) connects connecting pieces 410 of push-pull member 490 and connecting portion 210 of sliding plate 200 and rotates. Fastening portion 270 of sliding plate 200 is hooked at fastened groove 310 so that panel 300 is urged to the front side of sliding plate 200. Panel 300 is received in accommodating portion 250 of sliding plate 200 and fixed at sliding plate 200 by fixing members 540 of detaching portion 500 through passing holes 290 formed in sliding plate 200.

When user wants to use the cassette deck of the car audio, user pushes eject knob installed on the front side of panel 300 so that motor 430 is driven. The pinion gear rotates according to the driving of motor 430. Push-pull member 490 moves in the direction of arrow A shown in FIG. 4(B) by the turning force transferred to rack gear 450 because the pinion gear is engaged with rack gear 450 installed at push-pull member 490. Thus, one side of sliding plate 200 connected with connecting piece 410 of push-pull member 490 leaves spaces from the front face of escutcheon 100 and rotates. At the same time, engagement protrusions 230 of sliding plate 200 are lead along guiding grooves 190 of escutcheon 100, and sliding plate 200 leans toward escutcheon 100 because sliding plate 200 is slid in the direction of arrow B, so that recording medium inserting slot 130 installed in the front side of escutcheon 100 is opened. User inserts the recording medium into recording medium inserting slot 130 and pushes one side of panel 300 connected with push-pull member 490 toward escutcheon 100. Then, recording medium inserting slot 130 is closed because engagement protrusions 230 move along guiding grooves 190 in a direction which is opposite to that of arrow B.

When user wants to detach panel 300 from escutcheon 100, user pushes detachment knob 330 and pushed part 520 of detaching portion 500 is urged toward escutcheon 100 so that fixing members 540 are freed from fixing grooves(not shown in figures) of the rear side of panel 300. Fastening portion 270 of sliding plate 200 becomes disengaged from fastened groove 310 of panel 300.

In the device for moving and detaching the panel of the present invention according to this construction, construction of the device is simple and the number of construction members is reduced because the panel is secured to the sliding plate by hooking the rear face of the panel with the detaching portion, and the panel is released from the sliding plate when the panel disconnects from the sliding plate owing to the pushing of the detachment knob installed at the panel.

The device for moving and detaching the panel in the present invention has no other connection members which are connected between the detachment knob for detaching the panel from the sliding plate. Also, the construction of the detachment portion is simple and the number of procedures required when the user attaches the detachment portion on the car audio body is decreased so that it takes minimal time for the user to attach the detachment portion on the car audio body.

Also, the recording medium inserting slot is smoothly opened and closed due to the upward and downward movement of the sliding plate by the operation of the push-pull portion. Also, the panel is inclined toward the escutcheon at a predetermined angle so as to turn the front of the operation portion of the panel in an upper direction when the recording medium inserting slot is opened, so that the operation knobs are easily operated.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. A device for moving and detaching a panel comprising:
    an escutcheon having a recording medium inserting slot formed therein to insert/eject the recording medium into/from said recording medium inserting slot and installed to a car audio body to close an opening portion of said car audio body;
    a sliding plate, having a front side detachably connected with said panel, for opening and closing said recording medium inserting slot by being upwardly and downwardly slid when one side of said sliding plate is urged toward one of said panel and said car audio body;
    a push-pull portion, connected with the side of said sliding plate, for pushing and pulling the side of said sliding plate toward one of said panel and said car audio body; and
    a detaching portion, installed on the rear face of said sliding plate, for detachably connecting said panel with said sliding plate due to an elastic force and a restoration force of said detaching portion.

2. The device for moving and detaching a panel as claimed in claim 1, wherein said escutcheon comprises:
    a front plate with a slit for the coming in and out of one side of said push-pull portion connected with said sliding plate to pull and push said sliding plate; and both side walls folded from both side edges of said front plate toward said panel and formed with guiding grooves gently sloped toward the longitudinal direction for leading said sliding plate.

3. The device for moving and detaching a panel as claimed in claim 2, wherein said sliding plate comprises:

an accommodating portion folded from the edges of said sliding plate toward said panel and extended for receiving said panel;

a connecting portion connected with said push-pull portion, said connecting portion rotating with one side of said push-pull portion as the center connected with said sliding plate to upwardly and downwardly slide said sliding plate according to the movement of said push-pull portion; and engagement protrusions projected from said accommodation portion and engaged with said guiding grooves for sliding said sliding plate along with said guiding grooves according to the rotation of said sliding plate.

4. The device for moving and detaching a panel as claimed in claim 3, wherein said push-pull portion comprises:

a push-pull member having connecting pieces folded from both sides of said push-pull member for connecting with said connecting portion of said sliding plate and a limited movement portion which allows for moving said sliding plate at a predetermined range;

a moving force generating portion fixed at a fixing bracket installed at the rear side of said escutcheon for supplying a force to move said push-pull member; and a moving force transferring portion connecting said moving force generating portion and said push-pull member for transferring the moving force from said moving force generating portion to said push-pull member.

5. The device for moving and detaching a panel as claimed in claim 4, wherein said limited movement portion comprises a slit formed at a predetermined length at said push-pull member and a rivet pierced through said slit and fixed at a bottom face of said car audio body.

6. The device for moving and detaching a panel as claimed in claim 4, wherein said moving force generating portion is a motor having a pinion gear engaged with said moving force transferring portion.

7. The device for moving and detaching a panel as claimed in claim 6, wherein said moving force transferring portion is a rack gear fixed at said push-pull member and engaged with said pinion gear.

8. The device for moving and detaching a panel as claimed in claim 1, wherein said detaching portion comprises:

a pushed part urged by a detachment knob to release said panel from said rotating plate;

fixing members integrally formed with the front face of said pushed part in upper and lower parts of said pushed part for fastening said panel to said rotating plate by hooking said panel;

supporting portions integrally formed with said fixing members to insert a detaching portion fixing shaft through said supporting portions for fixing said detaching portion at said rotating portion; and a spring member installed between said supporting portions to insert said detaching portion fixing shaft into said spring member and connected so as to urge the rear faces of said pushed part and said rotating plate for returning said fixing members to the original position when said panel is detached from said rotating plate.

9. A device for moving and detaching a panel comprising:

an escutcheon having a recording medium inserting slot formed therein to insert/eject the recording medium into/from said recording medium inserting slot and installed at a car audio body to close an opening portion of said car audio body;

a sliding plate, having a front side detachably connected with said panel, for opening and closing said recording medium inserting slot by being upwardly and downwardly slid when a side of said sliding plate is urged toward one of said panel and said car audio body;

a push-pull portion, connected with the side of said sliding plate, for pushing and pulling the side of said sliding plate toward one of said panel and said car audio body; and a detaching portion, installed on the rear face of said sliding plate, for detachably connecting said panel with said sliding plate due to an elastic force and a restoration force of said detaching portion;

wherein said escutcheon comprises a front plate with a slit for the coming in and out of one side of said push-pull portion connected with said sliding plate to pull and push said sliding plate, and both side walls folded from both side edges of said front plate toward said panel and formed with guiding grooves gently sloped toward the longitudinal direction for leading said sliding plate;

wherein said sliding plate comprises an accommodating portion folded from the edges of said sliding plate toward said panel and extended for receiving said panel, a connecting portion connected with said push-pull portion, said connecting portion rotating with one side of said push-pull portion as the center connected with said sliding plate to upwardly and downwardly slide said sliding plate according to the movement of said push-pull portion, and engagement protrusions projected from said accommodation portion and engaged with said guiding grooves for sliding said sliding plate along with said guiding grooves according to the rotation of said sliding plate;

wherein said push-pull portion comprises a push-pull member having connecting pieces folded from both sides of said push-pull member for connecting with said connecting portion of said sliding plate and a limited movement portion which allows for moving said sliding plate at a predetermined range, a moving force generating portion fixed at a fixing bracket installed at the rear side of said escutcheon for supplying a force to move said push-pull member, and a moving force transferring portion connecting said moving force generating portion and said push-pull member for transferring the moving force from said moving force generating portion to said push-pull member; and wherein said detaching portion comprises a pushed part urged by a detachment knob to release said panel from said rotating plate, fixing members integrally formed with the front face of said pushed part in upper and lower parts of said pushed part for fastening said panel to said rotating plate by hooking said panel, supporting portions integrally formed with said fixing members to insert a detaching portion fixing shaft through said supporting portions for fixing said detaching portion at said rotating portion, and a spring member installed between said supporting portions to insert said detaching portion fixing shaft into said spring member and connected so as to urge the rear faces of said pushed part and said rotating plate for returning said fixing members to the original position when said panel is detached from said rotating plate.

* * * * *